United States Patent [19]

Beaulieu, Jr.

[11] Patent Number: 4,821,446
[45] Date of Patent: Apr. 18, 1989

[54] WIND RESISTANT ICE FISHING SIGNAL DEVICES

[76] Inventor: Joseph R. Beaulieu, Jr., Box 1294, Bucksport, Me. 04416

[21] Appl. No.: 99,303

[22] Filed: Sep. 21, 1987

[51] Int. Cl.⁴ ............................................. A01K 97/12
[52] U.S. Cl. .......................................................... 43/17
[58] Field of Search ................................... 43/17, 16, 4

[56] References Cited

U.S. PATENT DOCUMENTS

| | | | |
|---|---|---|---|
| 2,502,231 | 3/1950 | Oberg | 43/17 |
| 2,518,517 | 8/1950 | Baulski | 43/17 |
| 2,565,379 | 8/1951 | Laurila | 43/17 |
| 2,598,778 | 6/1952 | Fred | 43/17 |
| 2,651,875 | 9/1953 | Brockman | 43/17 |
| 2,785,493 | 3/1957 | Theil | 43/17 |
| 2,788,602 | 4/1957 | Dzuba | 43/17 |
| 2,999,328 | 9/1961 | Revord | 43/17 |
| 3,078,610 | 2/1963 | Howell | 43/17 |
| 3,196,570 | 7/1965 | Borisch | 43/17 |
| 3,729,849 | 5/1973 | Richard | 43/17 |

Primary Examiner—Nicholas P. Godici
Assistant Examiner—Karen Skillman

[57] ABSTRACT

A wind resistant ice fishing device has a post provided at one end with a reel and with a signal arm pivoted to the other end. The post is pivotally connected to a support to enable it to be collapsed or erected for use with the support straddling a hole through the ice and the reel carrying end of the post in the hole and the other end vertical. A latch attached to the same side as the signal arm of the post is positionable to entrap the signal arm in a depending position in alignment with the post until released by the turning of the reel in response to a pull on the line indicates a fish has taken the bait. The signal arm is then erected by a spring attached to said side and connected to the signal arm by a line trained about the pivoted end of the arm. As the signal arm, the arm erecting spring and the latch are all on the same side of the post, the device may be so positioned that those components are effectively shielded from the wind.

3 Claims, 3 Drawing Sheets

WIND RESISTANT ICE FISHING SIGNAL DEVICES

BACKGROUND OF THE INVENTION

Ice fishing devices to signal that a fish has taken the bait are widely used and those that are constructed to position their reels under water when the devices are erected and set in place for use, are deservedly popular since their lines do not freeze as is often the case when the reels are above water then to prevent the flags from becoming operative to indicate that a fish has taken the bait.

Signal devices constructed to have their reels under water when in use have their flags held inoperatively positioned by a latch until tripped by the turning of the reel when the line is pulled by a fish taking the bait and starting to swim off with it. A common occurence is to have the flag accidentally released, usually by the wind, with the result the flag is erected even though the bait is untouched.

THE PRESENT INVENTION

The general objective of the present invention is to provide ice fishing signal devices in which accidental release by the wind of the flag or other signal is prevented.

In accordance with the invention, this objective is attained by providing a signal arm having one end pivotally connected to the end of the post which is to extend vertically upwardly when the signal device is in use and which is held by a latch in a depending position in alignment with the post until released in response to the turning of the reel. The signal arm is erected into a vertical position against a stop by means of a tensioned spring connected to the post and exerting its erecting force on the signal arm by a line trained about the pivoted end thereof and secured to the signal arm on the opposite side of the pivot. The latch spring and signal arm are all connected to and shielded by the same side of the post so that the trap may be positioned to prevent the wind from unlatching the signal arm.

Other objectives of the invention and the manner of their attainment will be apparent from the following description of a preferred embodiment and the appended claims.

BRIEF DESCRIPTION OF THE DRAWINGS

The accompanying drawings illustrate a preferred embodiment of the invention

THE PREFERRED EMBODIMENT OF THE INVENTION

Figure 1:
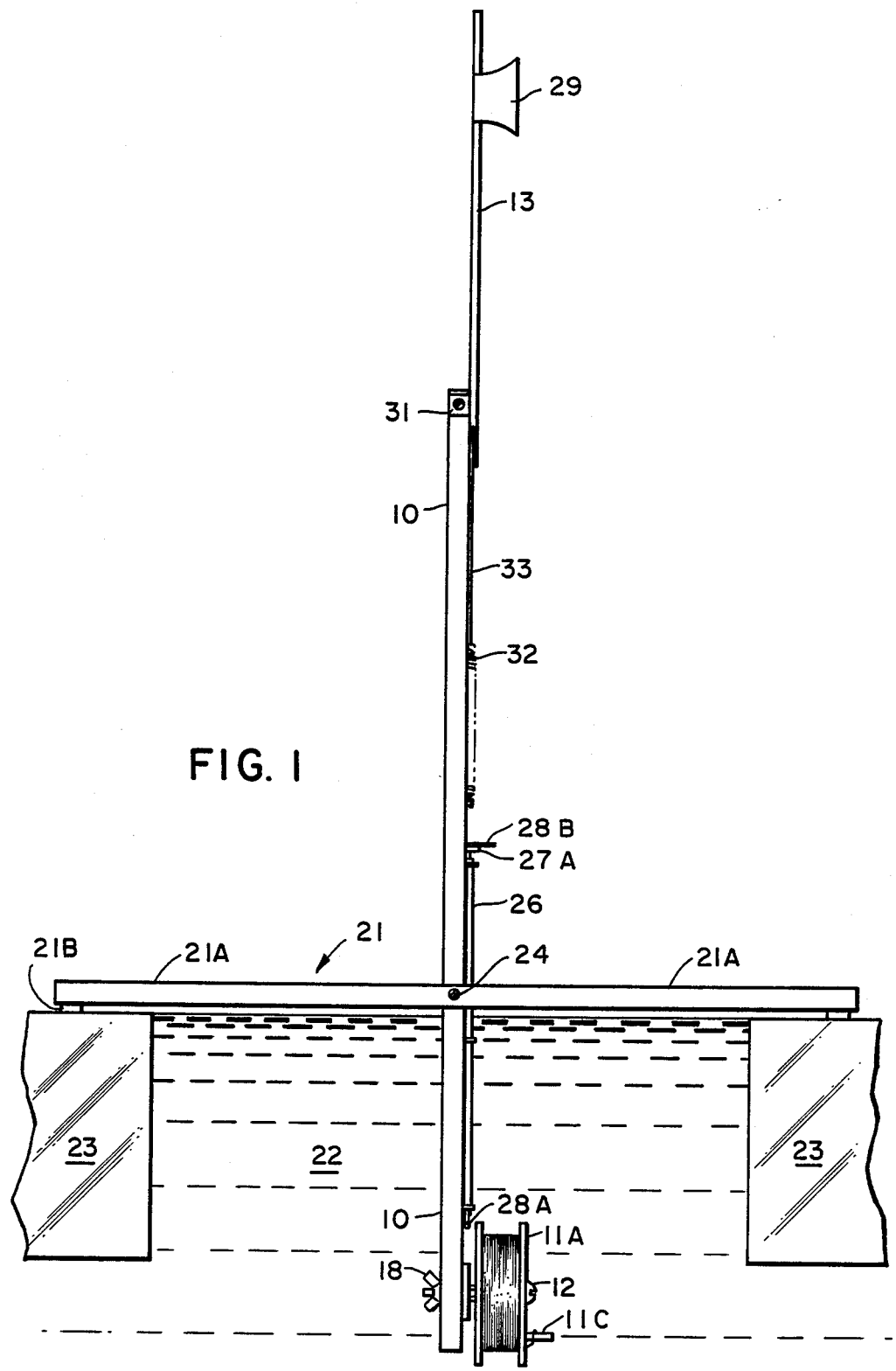
FIG. 1 is a side view of a signal device in accordance with the invention erected and positioned for use.

The ice fishing signal device illustrated by the drawings has a post 10 shown as rectangular in cross section.

A reel 11 is mounted on one side of the post 10 adjacent one end thereof by a pivot 12 and one end of a signal arm 13 is connected to the same side of the post 10 adjacent its other end by a pivot 14.

Figure 6:
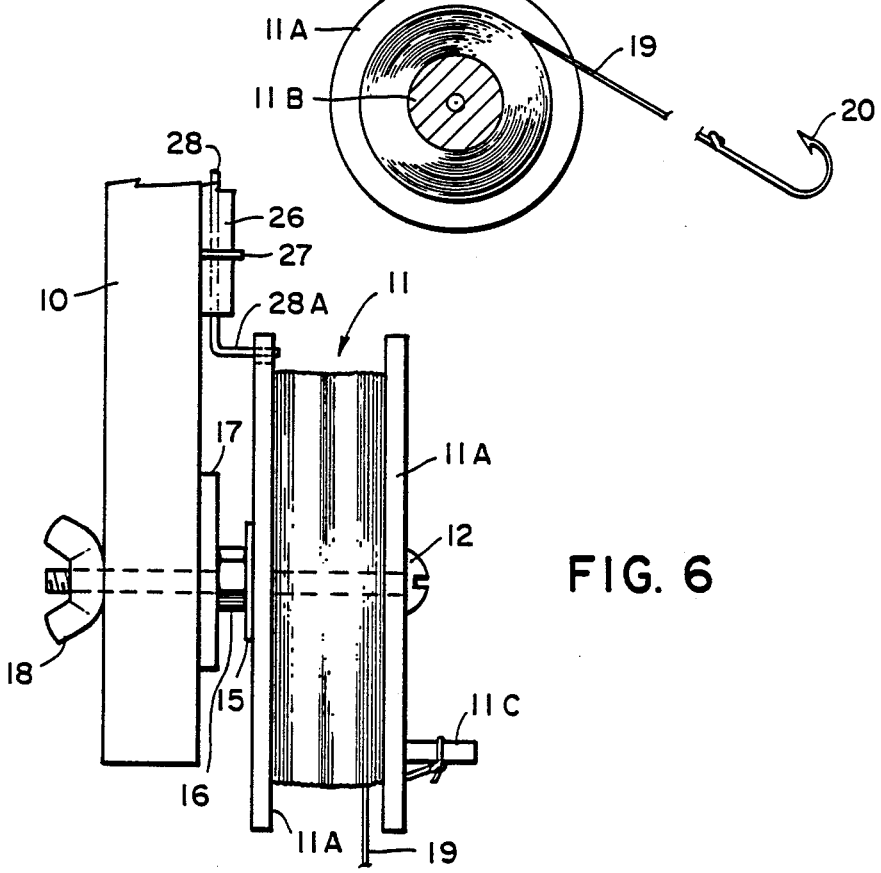
FIG. 6 is a fragmentary view showing the attachment of the reel to the post and the latch releasably holding the reel against turning.

The reel pivot 12 is shown, see FIG. 6, as a machine screw extending freely through the reel 11, a washer 15, a nut 16 threaded on the screw, through a spacer 17 and the post 10 with the assembly anchored to the post by a wing nut 18 threaded on the free end of the screw 12. The reel 11 may turn freely on its pivot or be subjected to a wanted degree of drag by turning the screw in one direction or the other by means of a screw driver.

The reel 11 is preferably formed by bonding circular wooden flanges 11A to the ends of a wooden hub 11B with the outer flange provided with a handle 11C. The reel 11 is provided with a suitable length of line 19 to the free end of which a hook 20 is attached.

The signal device has a support generally indicated at 21 for the post 11 which is of a length enabling it to straddle a hole 22 through the ice 23 with its end portions resting on the surrounding ice. The support 21 is shown as having side members 21A interconnected at their ends by transverse members 21B attached to the undersurface thereof. It will be noted that the side members 21A are so bowed and disposed that the support 21 is wider at its ends than it is at its middle where the members 21A are so spaced that the post 10 fits between them and is connected thereto by a pivot, generally indicated at 24 and shown as a machine screw extending through the side members 21A and the post 10 with a wing nut 25 threaded thereon.

It will be noted that while the pivot 24 is centrally of the support 21, it so divides the post 10 that the reel carrying end portion is shorter than the end portion to which the signal arm 13 is pivotally connected. The ice fishing device may be collapsed for convenience in carrying it or when it is to be placed in storage by so pivoting the post 10 that it extends lengthwise of the side members of the support 21. In its collapsed position, the reel carrying end portion of the post 10 fits between the side members 21A with its extremity close to the adjacent transverse member 21B and the other end portion between and extending somewhat beyond the other ends of the side members.

When the ice fishing device is erected for use, the post 10 is so pivoted that it is substantially perpendicular with respect to its support 21 and the wing nut 25 enables the device to be easily locked in either its collapsed or its erected position.

In order that the signal arm 13 will respond when a fish has taken the bait, a tubular guide 26 is attached as by staples 27 on the side of the post 10 to which the reel and the signal arm 13 are connected. The guide 26 is of a length such that one end is close to the inner flange of the reel 11 and its other end extends into the other end portion of the post 10.

A rod 28 extends through and is rotatable within the guide 26 and has a latch portion exposed at each end, the latch portion 21A for use in releasably holding the reel 11 against turning and the latch portion 21B for holding the free end of the signal arm 13 against movement from a depending position in alignment with the post 10.

The guide 26 contains a grease which prevents water from entering it and is of a type which does not solidify except at low temperatures, −40° F., for example, and yet does not escape therefrom when subjected to high temperatures to which the devices may be subjected during storage.

Figure 2:
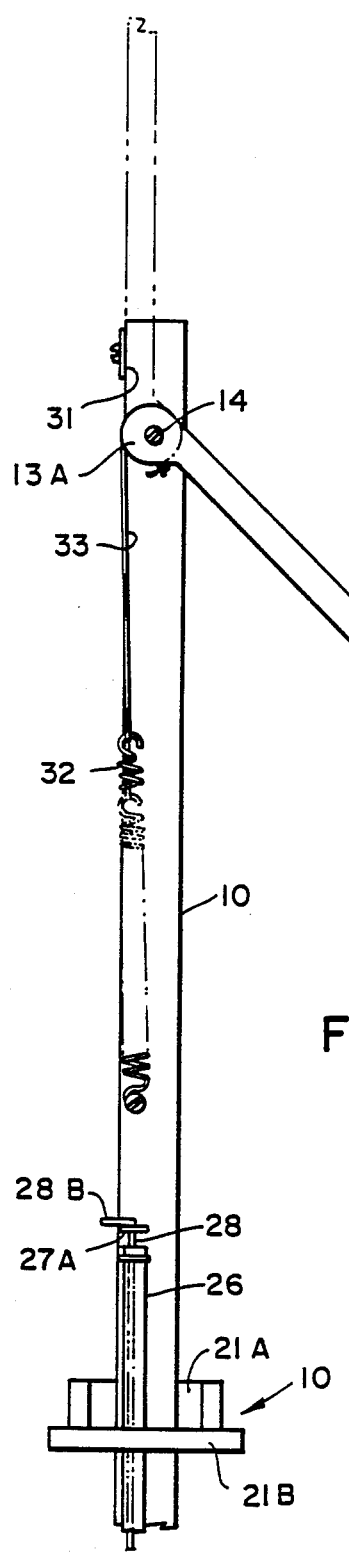
FIG. 2 is a fragmentary view, on an increase in scale, showing the signal arm in an intermediate position.
Figure 3:
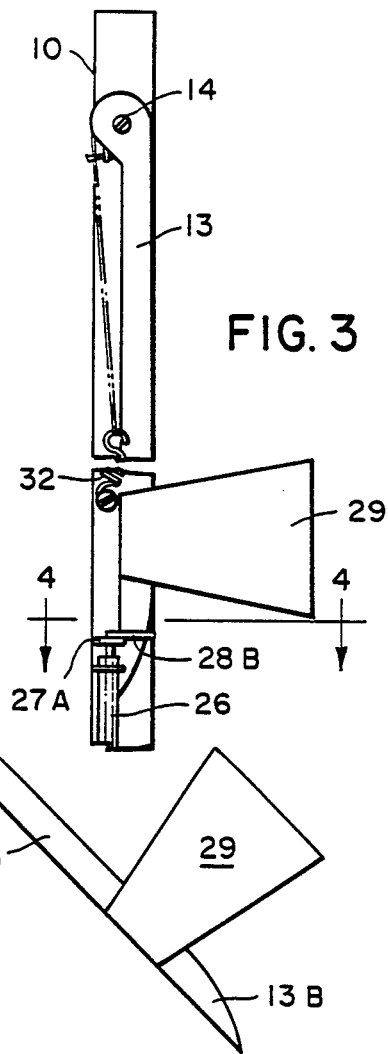
FIG. 3 is a like view with the signal arm held by the latch.
Figure 4:
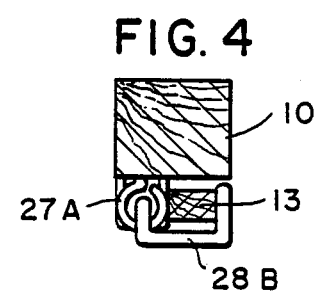
FIG. 4 is a fragmentary and partly sectioned view showing the reel held by the latch member.
Figure 5:
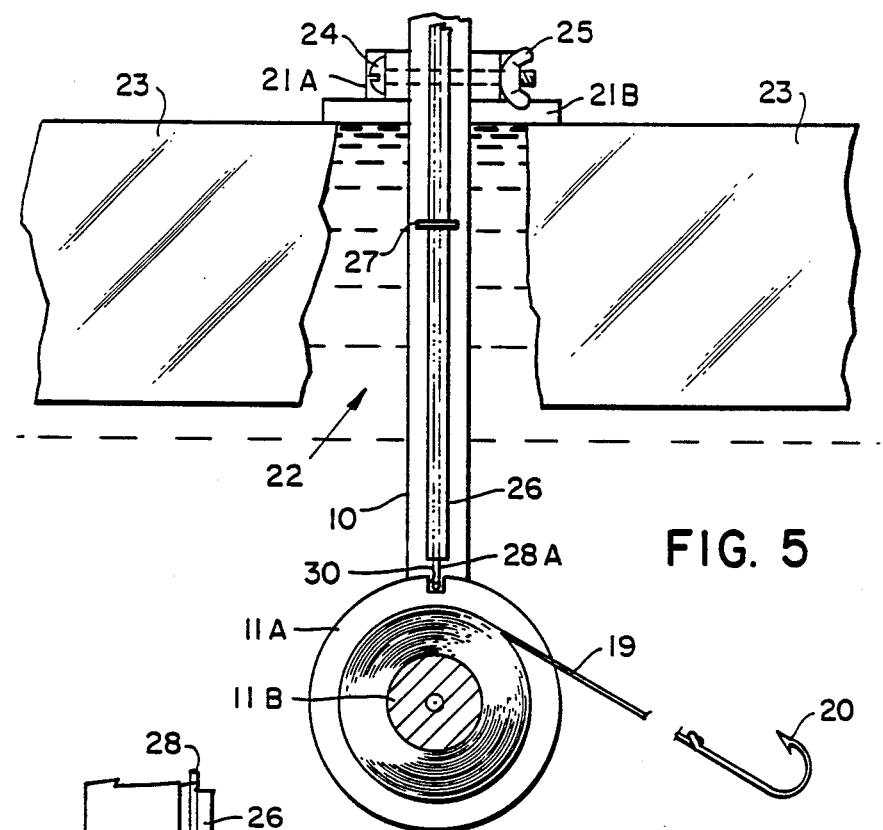
FIG. 5 is a section, on an increase in scale, taken approximately along the line 5—5 of FIG. 4.

It will be noted, see FIGS. 2 and 3, that the end 13A of the signal arm is offset and rounded with respect to the remainder thereof which, except for its tapered end 13B is about one-half the width of the face of the post 10 to which the arm 13 is pivoted. The signal arm 13 throughout its length is thinner than the post 10. In practice the sides of the post are five-eighths of an inch in width and the arm 13 is a quarter of an inch in thickness by way of example and not of limitation. The width of the arm 13 is three-eighths of an inch. When the arm 13 is pivoted into a predetermined position over the side of the post to which it is pivoted, one edge of the arm extends lenghtwise of the edge of that post side. The arm end 13B tapers inwardly with respect to said other edge and close thereto, a flag 29 is attached to the outer surface of the arm 13.

The latch portion 28A is formed by bending the appropriate end of the rod 28 into a substantially right angular position. As the latch portion 28A is to hold the reel 11 against unwanted turnings, the reel is shown as having a portion of the periphery of the reel flange 11A adjacent the post 10 with a shouldered recess which receives the latch portion 28A when in a predetermined position relative thereto and when the latch portion 28A has been turned to be normal relative to the post 10.

The latch portion 28B is a U-shaped bend dimensioned and disposed to overlie the tapered end 13B of the signal arm 12 when in its predetermined position shown in FIG. 3 and when the rod 28 has been turned with its portion 28A in holding contact with the reel 11.

The signal arm 13, if released by the turning of the rod 28 in response to the turning of the reel 11 to disengage the latch portion 28B therefrom is erected against a stop 31 at the upper end of the post 10 by resilient means consisting of a spring 32 having one end anchored to the side of the post 10 to which the signal arm 13 is pivoted and extending along the side of the arm when in its predetermined position and a length of Nylon line 33 connected thereto and trained over the rounded end 13A of the signal arm and anchored thereto, the arm 13 on the opposite side of the arm pivot 14.

In use, the ice fishing device is erected and an appropriate length of line 19 pulled from the reel 11 to place the baited hook at the wanted depth. The latch member 28 is then caught in the reel flange recess 30 and the signal arm 13 is entrapped by the latch portion 28B to prevent the signal arm 13 from being moved by the tensioned spring 32. The baited hook is then lowered through the hole 22 in the ice and the ice fishing device is then positioned with its support 21 straddling the hole. In practice and if the wind is blowing, the ice fishing device is so placed that the side of the post to which the signal arm 13 is attached is down wind. When a fish takes the baited hook, a pull is exerted on the line resulting in the freeing of the signal arm 13 which is then erected against the stop and is thereby held in alignment with the post 10 and as an extension thereof. As the arm 13, the spring 32 and the arm latching means are all on the same side of the post 10, the proper positioning of an ice fishing device relative to the wind ensures that an ice fishing trap in accordance with the invention are resistant to giving false signals, a result also contributed to by the entrapment of the arm end 13B by the latch portion 28B.

I claim:

1. An ice fishing device including a post having at least one side which is flat, a support dimensioned to straddle a hole in the ice and pivotally connected to the post between the ends thereof and positionable to hold the post vertically with one end portion extending downwardly, a flanged reel rotatably connected to said one end portion at said one side, a rigid signal arm of a substantial width one end of which is pivotally connected to the post adjacent the other end thereof to swing in a plane parallel to said one side between a depending inoperative position overlying a lengthwise portion thereof and an operative vertical position in alignment with the post, resilient means operable to swing said arm from its operative position and including a coil spring one end of which is anchored to said one side between said upper post end and said support and a line connected to the other spring end and trained about the pivoted arm end and connected to the arm adjacent thereto, said line dimensioned to hold the spring tensioned in any position of the arm, said other spring end at all times below the pivoted arm end, and latch means extending lengthwise of said one side and rotatable between first position and second positions, in the first position the latch releasable held by the reel and the free end of the arm held if in its operative position and in the second latch position, the latch turned by the reel and the free arm end released.

2. The ice fishing device of claim 1 in which the latch means includes a rod having a laterally disposed end for holding engagement with the reel and a U-shaped end disposed and dimensioned to receive the free end of the arm and seat it against said one side with the closed end of the U-shaped portion at right angles to the laterally disposed rod end.

3. The ice fishing device of claim 1 in which the thickness of the arm is substantially less than the thickness of the post, the arm includes a rounded offset end portion through which the arm pivot extends, the remainder of the arm is of substantially less width than said one side and in the depending position thereof lies against said one side with the arm side which is the leading side when the arm swings towards its signalling position close to one edge of said one side and the other arm side is substantially parallel to but spaced inwardly from the other edge of said side, and the resilient means is anchored to and extends along said side in the space adjacent said other edge.

* * * * *